(12) United States Patent
Gorbell et al.

(10) Patent No.: US 6,703,154 B2
(45) Date of Patent: Mar. 9, 2004

(54) SOLID OXIDE FUEL CELL COMPRESSION BELLOWS

(75) Inventors: Brian Gorbell, Calgary (CA); Craig Talbot, Calgary (CA)

(73) Assignee: Global Thermoelectric Inc., Calgary (CA)

( * ) Notice: Subject to any disclaimer, the term of this patent is extended or adjusted under 35 U.S.C. 154(b) by 65 days.

(21) Appl. No.: 09/682,610

(22) Filed: Sep. 26, 2001

(65) Prior Publication Data

US 2003/0059661 A1 Mar. 27, 2003

(51) Int. Cl.⁷ .............................. H01M 8/04; H01M 8/12
(52) U.S. Cl. ............................... 429/32; 429/33; 429/34
(58) Field of Search ........................... 429/33, 32, 34

(56) References Cited

U.S. PATENT DOCUMENTS

| | | |
|---|---|---|
| 4,067,585 A | 1/1978 | Rode |
| 4,909,313 A | 3/1990 | Voss et al. |
| 5,532,073 A * | 7/1996 | Hirata et al. .................. 429/34 |

FOREIGN PATENT DOCUMENTS

| | | | |
|---|---|---|---|
| CA | 1148795 | | 6/1983 |
| CA | 1186643 | | 5/1985 |
| DE | 19852363 | * | 5/2000 |
| JP | 5-62702 | * | 3/1993 |

* cited by examiner

*Primary Examiner*—John S. Maples
(74) *Attorney, Agent, or Firm*—Bennett Jones LLP

(57) ABSTRACT

A compression device for use with a solid oxide fuel cell stack is formed from a hermetically sealed cylindrical shell filled with an expansion fluid such as air. The shell has a corrugated sidewall which permits axial deformation as the compression device is heated. The shell applies a compressive frame to the stack when installed in the fuel cell stack.

12 Claims, 4 Drawing Sheets

SOLID OXIDE FUEL CELL COMPRESSION BELLOWS

BACKGROUND OF INVENTION

The present invention relates to a compression bellows, particularly for use in compressing a solid oxide fuel cell stack.

Solid oxide fuel cells (SOFCs) are constructed by stacking a series of flat interconnect plates and planar fuel cells together to form a fuel cell stack. Gaskets are placed between each interconnect plate to seal against the leakage of the gases utilized by the fuel cells. The gaskets require a constant clamping force to be exerted upon the stack to ensure proper sealing. As the fuel cell stack temperature increases from ambient to an elevated operating temperature, the different components comprising the stack and the clamping mechanism thermally expand at different rates. The net result can be a decrease in the clamping force on the gaskets, leading to gas leakage from the stack.

Conventional stack compression methods all have disadvantages for use with planar SOFCs. Most prior art compression methods utilize some form of threaded metal rods, which are tightened between the top and bottom plates of the SOFC stack by the use of nuts or other means. These metal rods lose strength and tend to creep at the elevated temperature encountered in fuel cell operation, reducing the amount of compression applied to the stack. Another disadvantage of the threaded rods is that they must be individually tightened to the correct amount of pre-load on the stack. If the correct amount of pre-load is exceeded there is a possibility of cracking the ceramic cells inside the stack, and if undetected this can result in burning of the hydrogen fuel, and catastrophic failure of the stack. A further disadvantage of the prior art is that the overall height of the stack may vary through thermal cycling, as the seals have a tendency to shrink. This will result in reduced compression on the stack, and the possibility of gas leakage. It is not practical to retorque the rods after each thermal cycle.

Therefore, there is a need in the art for a compression system suitable for use in a SOFC stack which mitigates the difficulties found in the prior art.

SUMMARY OF INVENTION

The present invention is directed to a compression system suitable for use in an SOFC stack, and is tolerant of thermal cycling. The compression bellows of the present invention may also find application in other high-temperature configurations where a compressive force at elevated temperatures (>500 deg. C.) is required.

Therefore, in one aspect, the invention may comprise a solid oxide fuel cell stack comprising a plurality of planar fuel cells, interconnects and gasket seals, a top plate and a bottom plate, and a compression apparatus disposed between the stack and at least one of the top or bottom plates, said compression apparatus comprising a shell defining a hermetically sealed interior volume, said shell applying a compressive force to the stack in response to an increase in temperature. The compression apparatus, or bellows, is placed against the fuel cell stack, between top and bottom plates which are fixed together with tie rods. At the operating temperatures of the fuel cells, the bellows applies a compressive force to the stack, by expanding or tending to expand against the stack.

In another aspect, the invention may comprise a solid oxide fuel cell stack compression apparatus comprising a cylindrical shell defining a hermetically sealed interior volume, said shell having a vertical dimension and a radial dimension, wherein the interior volume of the shell comprises a fluid which expands in volume and/or pressure in response to an increase in temperature, and wherein the shell may expand vertically but not radially.

In accordance with another aspect, the invention may comprise a compression apparatus for SOFC stacks comprising a shell defining a hermetically sealed interior volume filled with an expansion fluid, said shell having a vertical dimension and a horizontal dimension, wherein the shell is deformable in the vertical dimension as a result of an increase in pressure and/or volume of the expansion fluid.

BRIEF DESCRIPTION OF DRAWINGS

The invention will now be described by way of exemplary embodiments with reference to the accompanying simplified, diagrammatic, not-to-scale drawings. In the drawings.

DETAILED DESCRIPTION

The present invention provides for a compression apparatus suitable for use in a solid oxide fuel cell stack operating in excess of about 500° C. The compression apparatus is also tolerant of repeated thermal cycling from ambient temperatures to such elevated temperatures. When describing the present invention, all terms not defined herein have their common art-recognized meanings.

Figure 1:
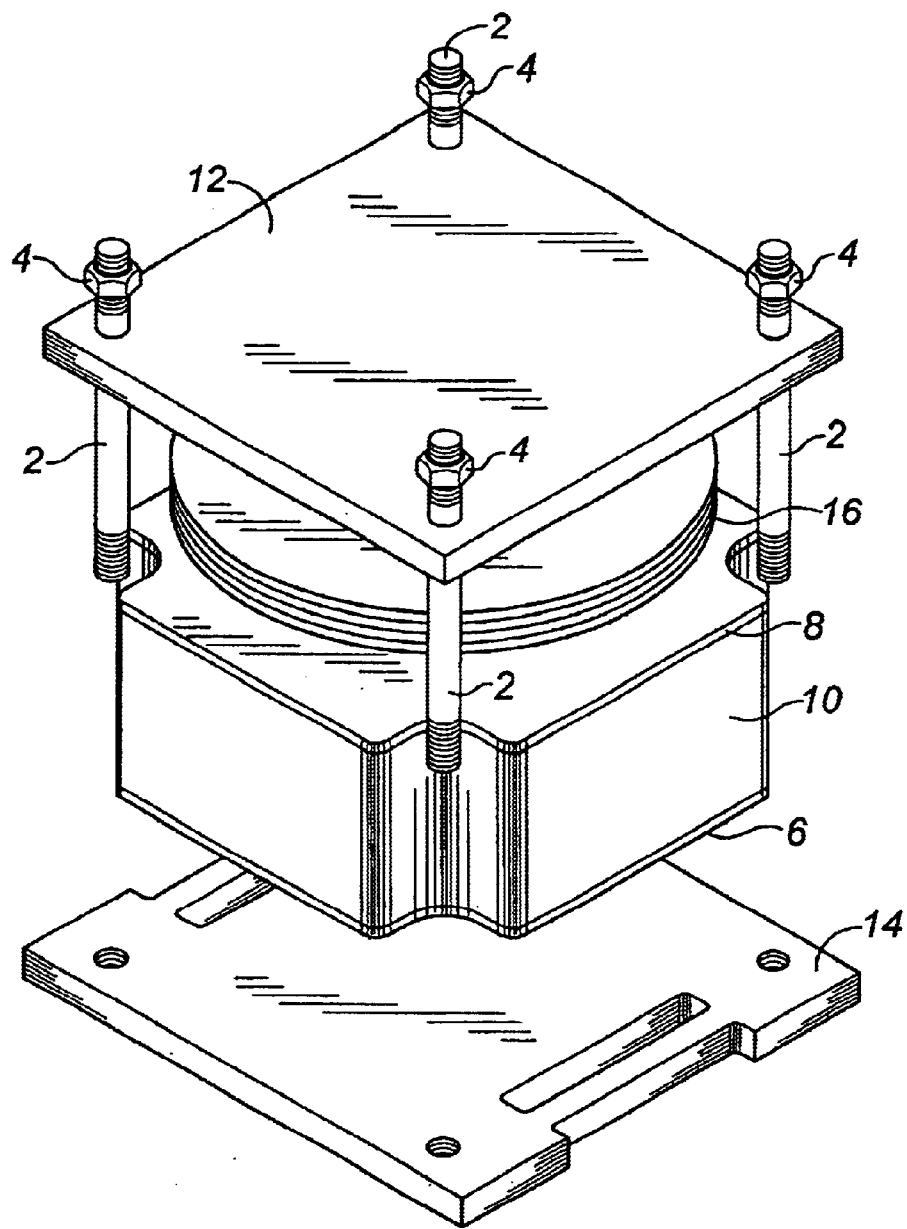
FIG. 1 is a cross-sectional view of a fuel cell stack with one embodiment of the compression apparatus in place.

As shown in FIG. 1, a fuel cell stack (10) includes a top compression plate (12) and a bottom manifold plate (14). The planar fuel cells and interconnects are interleaved within the stack (10), sandwiched between upper and lower current collectors (6, 8). The top compression plate (12) is secured to the manifold plate (14) by a plurality of tie rods (2) and securing nuts (4), as is well-known in the art. The compression bellows (16) of the present invention is placed above the upper current collector (8) and below the top plate (12). As will be appreciated by those skilled in the art, the bellows (16) may also be placed underneath the stack (10), between the lower current collector (6) and the bottom plate (14). The bellows are designed to expand vertically, or apply a vertical force, at the operating temperatures of the fuel cell stack, thereby imparting a compression force on the stack. As used herein, "vertical" or "vertically" refers to an axis which is normal to the plane of the individual fuel cells, interconnects and top and bottom plates (12, 14).

In a basic form, the bellows (16) comprises a hermetically sealed shell (18) filled with an expansion fluid. The shell (18) is formed from a material resistant to high-temperature and is configured to allow vertical deformation as the expansion fluid expands or pressurizes at elevated temperatures but resist horizontal deformation.

Figure 2:
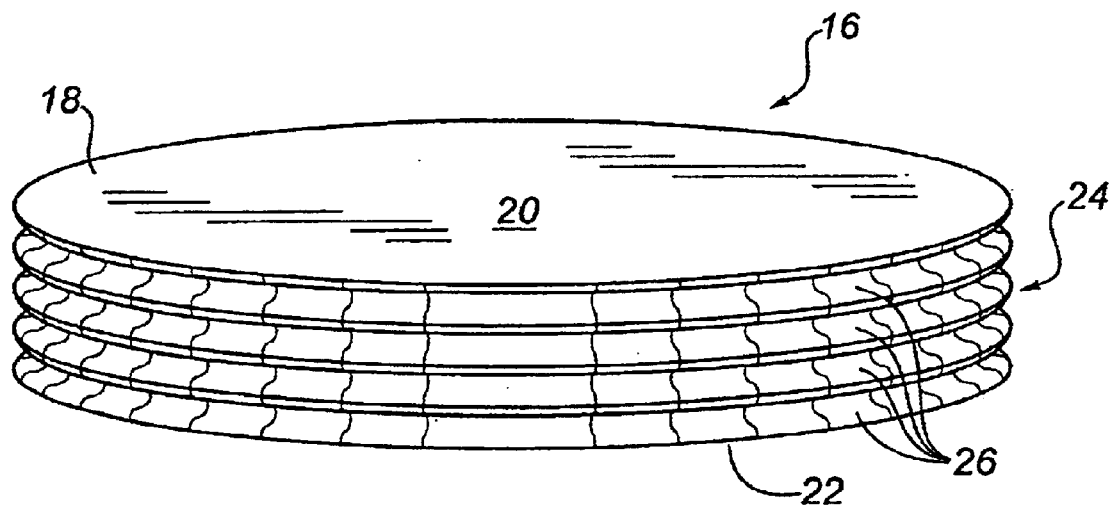
FIG. 2 is a view of one embodiment of a compression apparatus of the present invention.

In FIG. 2, one embodiment of a bellows (16) is illustrated. The apparatus is essentially cylindrical and formed from two circular end caps (20, 22) and a sidewall (24). In one embodiment, the sidewall (24) is corrugated which permits repeated vertical expansion and contraction of the shell (18). The sidewall (24) may be conveniently formed by stacking a plurality of load rings (26) which are seam welded together along their periphery. The end caps (20, 22) are attached to the sidewall (24) in a sealed manner. In one embodiment, the end caps (20, 22) are joined to the sidewall assembly (24) by nickel brazing, although any suitable process, such as welding can be used. Once the sidewall (24) and the end caps (20, 22) are joined together, the shell (18) is a sealed unit, and the expansion fluid contained inside cannot escape.

Figure 3:
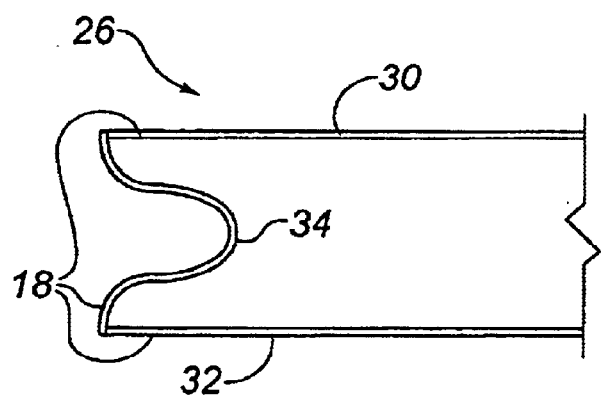
FIG. 3 is a cross sectional view of a load ring.

In a preferred embodiment, each load ring has the cross-sectional profile shown in FIG. 3. Each load ring has an upper surface (30) and a lower surface (32), joined by a curved portion (34). The upper and lower portions (30, 32) facilitate the joining of the load rings into a monolithic sidewall (24). The curved portion (34) provides the corrugation referred to above, thereby providing some limited vertical flexibility to the sidewall (24). A force which tends to separate the upper and lower surfaces will cause the curved portion to straighten. Additionally, this cross-sectional profile of the load ring reinforces the ring against radial forces which tend to deform the ring from its circular shape, or expand the ring diameter. The load rings (26) and therefore the side wall (24) have sufficient strength to resist deforming outwardly, that is to increase the diameter of the rings, at elevated temperatures. Therefore, the force of the expanding fluid within the shell causes the shell to expand vertically as the pressure of the expansion fluid rises.

The load capacity of the bellows is a function of both the vertical compressibility of the sidewall and the volume of expansion fluid within the shell (18) and its compressibility. At ambient temperatures, unpressurized expansion fluid contributes little to the load capacity of the bellows, unless the expansion fluid is an incompressible liquid. As temperature increases, gaseous expansion fluids become increasingly less compressible, and contribute more to the load capacity.

The number and diameters of the individual load rings (26) can be varied depending upon the load that the bellows is required to carry. Larger rings or a greater number of rings allows a greater load to be carried. If the available space precludes using larger rings, the expansion fluid of the bellows may be varied to increase the load carrying capacity. In one embodiment, the expansion fluid is air at atmospheric pressure at an ambient temperature. While a gas at atmospheric pressure is easily compressible, at the elevated operating temperature within the fuel cell stack, the pressure within the bellows will increase to a level which makes the bellows very difficult to compress. As a result, when placed against the fuel cell stack and buttressed by the top plate, the bellows will resist expansion of the stack, or expand itself against the stack, thereby creating a compressive force on the stack.

In alternative embodiments, if the expansion fluid is a gas such as air, it may be pressurized when assembled to increase the load capacity of the bellows. In one embodiment, the expansion fluid may be a pressurized inert gas such as nitrogen or argon. In another embodiment, the expansion fluid may be a low melting point metal such as aluminium or lead. Although solid at ambient temperatures, at the operating temperature of a SOFC stack, the metal will melt. Since liquids are incompressible, the molten metal will prevent crushing of the bellows under high loads, and yet still provide a compressive force due to the expanded volume caused by the phase change of the aluminium and its thermal expansion.

In one embodiment, the load rings (26) are commercially available from the Temper Corporation of Fonda, N.Y., and are designed to resist horizontal deformation at elevated temperatures, and are typically used in gas turbines. In one embodiment, the load rings may be made from high temperature creep resistant nickel based alloys such as Hastalloy (TM) or Altemp(R) HX, produced by the Allegheny Ludlum Corporation, Pittsburgh, Pa. or similar high-grade materials. These alloys have excellent resistance to corrosion and creep at high tempertures. Other suitable alloys or materials may also be used which provide high creep resistance at elevated temperatures. The end caps (20, 22) of one embodiment are made from Inconel 601 (R) but may also be made from other suitable high-temperature materials.

Figure 4:
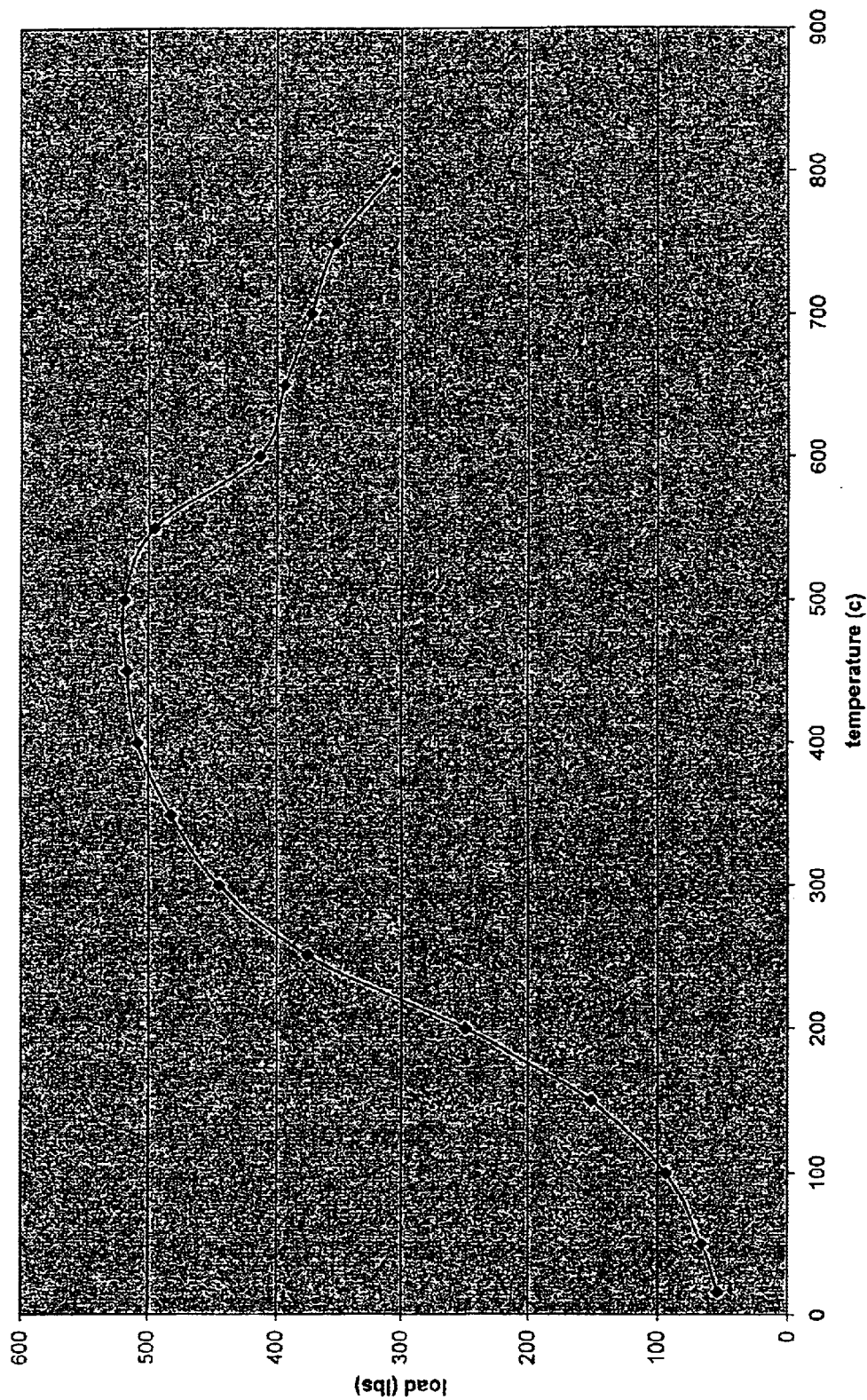
FIG. 4 is a graph of a temperature load profile of one embodiment of the invention.
Figure 5:
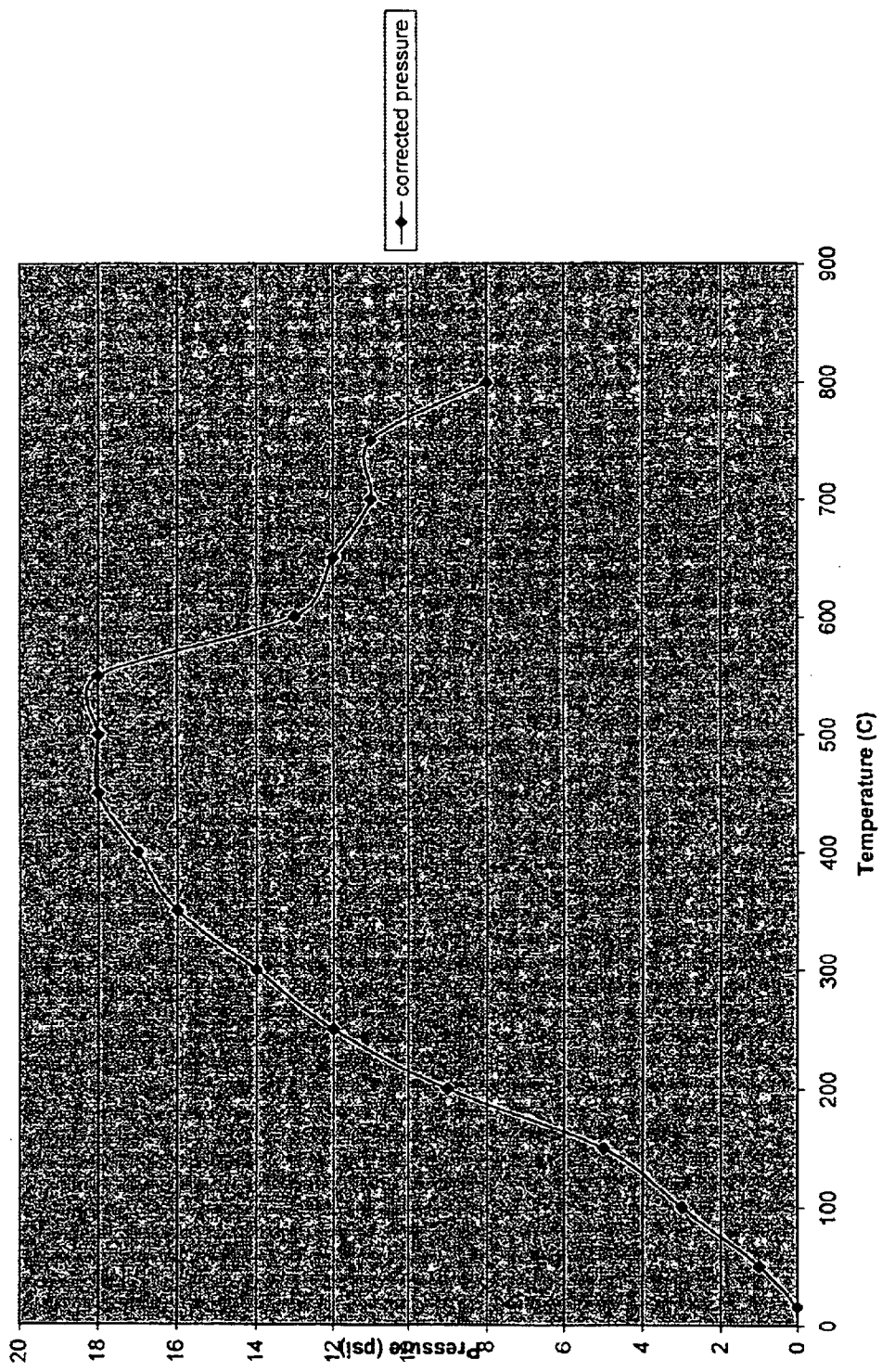
FIG. 5 is a graph of a temperature pressure profile of one embodiment of the invention.

The following example is intended to illustrate the claimed invention but not to limit it. A bellows was made from four load rings, each approximatey 12 cm in diameter an 6 mm in height. Each load ring was obtained from Temper Corporation of Fonda, NW and made from Altemp (R)HX, produceegheny Ludlum Corporation, Pittsburgh, Pa. The load rings were welded together to form the sidewall and capped with Inconel 601 end caps which were nickel brazed to the sidewall. The expansion fluid was air at atmospheric pressure. The bellow was preloaded with about 50 lbs of force and heated to 800 deg. C. Pressure within the bellows and the load were measured periodically. The resulting temperture-load and temperature-pressure profiles are shown in FIGS. 4 and 5 respectively. As may be seen, maximum load and pressure resulted between about 500 deg. C. to about 600 deg. C. Above 600 deg. C., it is believed that the air within the bellows began to behave in a non-Newtonian manner. Nevertheless, a significant force, in excess of 300 lbs, was applied by the bellows through a broad temperature range.

The specific methods of using and manufacturing the bellows described herein are not intended to limit the claimed invention unless specifically claimed in that manner below. As will be apparent to those skilled in the art, various modifications, adaptations an variations of the foregoing specific disclosure can be made without departing from the scope of the invention claimed herein.

What is claimed is:

1. A solid oxide fuel cell stack compression apparatus comprising a shell defining a hermetically sealed interior volume filled with an expansion fluid, said shell having a vertical dimension and a horizontal dimension, wherein the shell is deformable in the vertical dimension as a result of an increase in pressure and/or volume of the expansion fluid, wherein said shell is cylindrical and comprises a top end plate, a bottom end plate and a side wall fused to and separating the top and bottom end plates, wherein a vertical cross-sectional profile of the side wall is corrugated.

2. The apparatus of claim 1 wherein the corrugated sidewall comprises a plurality of rings stacked and fused together.

3. The apparatus of claim 2 wherein the rings are comprised of a high temperature creep resistant nickel based alloy.

4. The apparatus of claim 1 wherein the expansion fluid comprises a gas.

5. The apparatus of claim 4 wherein the gas is air at atmospheric pressure.

6. The apparatus of claim 4 wherein the gas is an inert gas and pressurized within the apparatus.

7. The apparatus of claim 1 wherein the interior volume is filled with a metal having a melting point within the operating range of the fuel cell.

8. The apparatus of claim 7 wherein the metal comprises aluminum.

9. The apparatus of claim 7 wherein the metal comprises lead.

10. A solid oxide fuel cell stack comprising a plurality of planar fuel cells, interconnects and gasket seals, a top plate and a bottom plate, and a compression apparatus as claimed in claim 1 disposed between the stack and at least one of the top or bottom plates, said thermal compression apparatus comprising a shell defining a hermetically sealed interior volume, said shell applying a compressive force to the stack in response to an increase in temperature.

11. A solid oxide fuel cell stack compression apparatus comprising a cylindrical shell defining a hermetically sealed interior volume, said shell having a vertical dimension and a radial dimension, wherein the interior volume of the shell comprises a metal which becomes fluid at an operating temperature of the fuel cell and which expands in volume and/or pressure in response to an increase in temperature, and wherein the shell may expand vertically but not radially.

12. The apparatus of claim 11 wherein the metal comprises aluminum or lead.

* * * * *